United States Patent [19]
Gotoh et al.

[11] 4,038,214
[45] July 26, 1977

[54] IMPREGNATED FIBROUS CATALYST FOR TREATING EXHAUST GAS OF AN INTERNAL COMBUSTION ENGINE AND PROCESS FOR MAKING SAME

[75] Inventors: Sotoji Gotoh, Yokosuka; Jun Nakamura, Tokyo; Yuji Abe; Tadashige Matsuo, both of Yokohama, all of Japan

[73] Assignee: Mitsubishi Jukogyo Kabushiki Kaisha, Japan

[21] Appl. No.: 707,507

[22] Filed: July 22, 1976

Related U.S. Application Data

[63] Continuation-in-part of Ser. No. 546,625, Feb. 3, 1975, abandoned, which is a continuation-in-part of Ser. No. 310,009, Nov. 28, 1972, abandoned, which is a continuation-in-part of Ser. No. 68,004, Aug. 28, 1970, abandoned.

[30] Foreign Application Priority Data

Aug. 28, 1969 Japan .................................. 44-68141

[51] Int. Cl.$^2$ ........................ B01J 23/86; B01J 23/84; B01J 35/06
[52] U.S. Cl. ................................... 252/458; 252/459; 252/477 R; 423/213.5; 428/273; 428/432
[58] Field of Search ............... 252/458, 459, 477 R, 252/470, 471, 432, 463, 466 J; 423/213.2, 213.5, 213.7; 23/288 FC; 427/125, 407 B; 428/389, 392, 432, 273

[56] References Cited

U.S. PATENT DOCUMENTS

| | | | |
|---|---|---|---|
| 2,349,844 | 5/1944 | Bertsch | 252/477 R |
| 2,389,378 | 11/1945 | Marisic | 252/477 R |
| 3,072,457 | 1/1963 | Bloch | 423/213.2 |
| 3,189,563 | 6/1965 | Hauel | 252/477 R |
| 3,197,955 | 8/1965 | Cohn et al. | 23/288 FC |
| 3,207,704 | 9/1965 | Stephens et al. | 252/463 |
| 3,247,665 | 4/1966 | Behrens | 23/288 FC |
| 3,362,783 | 1/1968 | Leak | 252/477 R |
| 3,405,704 | 10/1968 | Wintz | 252/477 R |
| 3,421,871 | 1/1969 | Davies | 252/463 |
| 3,544,264 | 12/1970 | Hardison | 23/288 FC |

FOREIGN PATENT DOCUMENTS

| | | | |
|---|---|---|---|
| 1,440,817 | 4/1966 | France | 252/477 R |

*Primary Examiner*—Winston A. Douglas
*Assistant Examiner*—P. E. Konopka
*Attorney, Agent, or Firm*—McGlew and Tuttle

[57] ABSTRACT

The converter includes a catalyst carrier in the form of a woven, porous sheet of a fibrous thermally-resistant material consisting predominantly of silica or alumina. The porous sheet is impregnated with a catalyst and thereafter calcined in a reducing atmosphere in order to activate it. The catalyst is a well-known material for facilitating the complete combustion of the exhaust gases. The porous net-like sheet is produced by using fibers of highly heat-resistant material consisting predominantly of silica, with extremely low alkali content, or by the use of fibers of a chemically and thermally stable quartz or special glass. The fibers used to produce the sheet may advantageously be twisted beforehand.

5 Claims, No Drawings

IMPREGNATED FIBROUS CATALYST FOR TREATING EXHAUST GAS OF AN INTERNAL COMBUSTION ENGINE AND PROCESS FOR MAKING SAME

CROSS-REFERENCE TO RELATED APPLICATIONS

This application is a continuation-in-part of abandoned application Ser. No. 546,625, filed Feb. 3, 1975, which, in turn, is a continuation-in-part of abandoned application Ser. No. 310,009, filed Nov. 28, 1972 and, in turn, a continuation-in-part of abandoned application Ser. No. 68,004, filed Aug. 28, 1970.

FIELD AND BACKGROUND OF THE INVENTION

Ever increasing urban atmospheric pollution, due to exhaust gases of automobiles, is one of the public hazards which is drawing near to the limit of the maintenance of health of city dwellers. In an attempt to solve this problem, catalysts have been utilized in mufflers for cleaning and purifying exhaust gases of cars. However, catalytic products capable of exhibiting satisfactory performance have not yet been produced because the following three requirements have not been met:

The first of these requirements is that the catalyst should be thermally stable and not lose its activity. This thermal stability has two meanings. One of them is that the start-up temperature leading to the exhibition of the catalyst activity should be low. It is sufficient if the catalyst does not act effectively unless the engine is warmed and the exhaust system is sufficiently heated. It is necessary that the catalyst should have thermal stability at high temperatures above 870° C when the temperature rises or great quantities of imperfectly burned products are formed. Hence, the catalyst should first meet the stability requirement in these two senses.

A second requirement is that the catalyst should be chemically stable. This means that the catalyst should not lose its activity by covering of its surface either chemically or physically with lead halides or oxyhalides of various vapor pressures which are produced from tetraalkyl leads, most commonly used anti-knocking agents for gasoline, and halogen compounds used for preventing the accumulation, in the combustion chamber of the engine, of oxides formed by the combustion of these anti-knocking lead compounds.

A third requirement is that the catalyst should be physically durable as well as chemically stable. This requirement is associated with a catalyst carrier rather than with the catalyst per se. The loss of a catalyst, as generally understood, results from the fact that the catalyst powder physically adsorbed on, or chemically bound to, the surface of the carrier, is scattered in the form of powder owing to the following reasons: friction is caused between the carriers or between the carriers and the catalyst structure; the carrier itself is destroyed by the stress caused by repeated thermal load; and the carrier is broken by the internal pressure which occurs when the water adsorbed to the porous carrier is swollen by an abrupt thermal load.

Especially in the case of purifying exhaust gases from cars, the aforesaid requirements, particularly the second and third, become very strict conditions. Thus, an internal combustion engine produces exhaust gas having a high temperature, high current speed and high pulsation, especially at the time of high load, such as at the time of acceleration, or ascending an upward slope. In such a case, gas having a current speed of as high as 70m a second is exhausted at a temperature exceeding 1000° C. Then, the pulsation inside the exhaust pipe becomes as high as above 200 times a second due to a pressure difference of above 0.7 kg/cm$^2$. In addition, mechanical vibration acts on the exhaust pipe. It is required that a car exhaust gas treating apparatus should carry out the expected cleaning and purifying action under such thermally and physically strict conditions of use. Moreover, the cleaning action should continue in full effect throughout the car driving distance of tens of thousands of kilometers, and this action should not offer resistance to discharge of exhaust gas.

These conditions of use pose problems which are difficult to solve, in that an internal combustion engine, provided with a catalytic converter, must operate properly under driving conditions which change abruptly and frequently, as in an automobile running in a city and subjected to stop, start and acceleration at frequent intervals. In such a case, the catalytic converter, whose object is to treat the exhaust gas, is subjected to special conditions which it must endure, including conditions which change irregularly and drastically. Nevertheless, the converter must effectively carry out predetermined cleaning and purifying of exhaust gases generated over a long period of time.

With a view to meeting these conditions, catalytic converters using a pellet-type catalyst and catalytic converters using a flame retardant fibred catalyst carrier, such as asbestos or kaolin, have been proposed. However, none of these proposals has satisfied the aforesaid three requirements and conditions. Especially for treating car exhaust gas, these converters have been completely unsatisfactory.

To obviate these disadvantages, a number of experiments have been made to increase the caking property or hardness of the carrier or to include the catalyst in the interior of the carrier by mixing the catalyst powder, the carrier powder and a caking agent together, with a view to preventing loss of catalyst due to the surface friction of the carrier in a pellet-type catalyst. These experimental studies, however, have not led to the production of catalyst having sufficient physical durability.

Hauel, U.S. Pat. No. 3,189,563 discloses a catalytic converter utilizing glass fibers as a catalyst carrier and, in this respect, bears some resemblance to the present invention. However, in accordance with the Hauel disclosure, the surface of a commercial glass fiber is coated with ceramics or refractory powder before formation of the carrier. In accordance with the Hauel disclosure, the ceramics are initially precoated as a surface treating agent, because it is difficult to directly coat a catalyst onto the surface of glass fiber, irrespective of whether or not an adhesive or the like is used. For this reason, in the Hauel arrangement, ceramics are precoated in advance on the surface of glass fiber, and the catalyst is coated on the surface of the ceramics. With the Hauel method, the degree of heat resistance of commercial glass fiber, which has a relatively low melting point, is increased.

In the method of coating ceramics or refractory in advance on the surface of glass fiber, as taught in Hauel, it is stated that a catalyst film or powder prevents attrition due to pulsation in exhaust gas of an automobile. However, because the flexibility of glass fiber is lost by these ceramic coatings, and the glass fiber is solidified, there is a danger that the glass fiber may be broken by mechanical (physical) shock, and it is not possible to continue stable operations for a long period of time. This constitutes a distinct disadvantage of the Hauel catalytic converter.

SUMMARY OF THE INVENTION

To overcome the disadvantages of prior art catalytic converters for use in treating exhaust gases of internal combustion engines, it is an object of the present invention to provide a catalytic converter, for treating the exhaust gases of internal combustion engines, of the type including a catalyst carrier and a catalyst supported on the carrier, and a process of producing the carrier, meeting the above-mentioned three requirements as well as having satisfactory physical durability as well as thermal and chemical stability.

The maintenance of the stability and durability of a car exhaust gas catalytic converter depends upon the choice and combination of carriers which help the catalyst to exhibit its inherent excellent activity.

Accordingly, as a catalyst carrier used for a catalyst for treating car exhaust gas, from the viewpoint of the aforesaid basic required performances, especially thermal stability and physical durability (stability), it is preferable to use a fibrous heat-resistant material in which the ratio of heat capacity to the surface of the carrier is small and there is little opportunity for friction between the carriers or between the carriers and the structure. However, when asbestos and other materials are used as the heat-resistant fiber, for example, asbestos decomposes thermally at 600° - 750° C. Therefore, under strict conditions of use, asbestos decomposes thermally and dissipates as a powder. Thus, it has not been possible to provide a satisfactory exhaust treating catalytic converter using these materials.

Even if a material having a sufficient heat resistance is used, unless it endures the severe pulsation conditions, it cannot be used to support the exhaust treating catalyst in a catalytic converter embodying the invention. For example, in case a kaolin fiber, known as a heat-resistant fiber is used, exhaust gas blows through or scatters due to repetition of violent pulsation and an efficient exhaust gas treating catalytic converter cannot be provided.

The present invention uses glass fiber consisting predominantly of silica as a catalyst carrier of a catalytic converter for treating exhaust gas and glass fiber made into a net-like sheet is used as a catalyst carrier.

As such, because glass fiber consisting predominantly of silica is used according to the present invention, it is possible to raise the heat-resistant temperature up to 1200° - 1300° C, and the strength is sufficient. Accordingly, because the heat-resistance and strength of this fiber meet the strict requirements, mentioned above, for conditions of use, different from the cases of using other fibers, exhaust gas is not scattered. Further, according to the present invention, this fiber is made into a net-like sheet, and individual fibers reinforce each other to resist the mobile pressure and pulsation of a gas current, to become tenacious and because very fine fiber may be utilized. In spite of the narrow space occupied, the fiber becomes a carrier having a large surface area.

In addition, the catalyst carrier used in the present invention is, as mentioned above, a woven net-like sheet. The decrement of pulsation of exhaust gas by mutually intertwined fibers is effective, and even when the duration and magnitude of the pulsation is large, the carrier does not vibrate violently. Again, because the present invention uses glass fiber consisting predominantly of silica and can use long fibers capable of forming a net-like sheet in the path of exhaust gas flow, there is an advantage that a catalytic converter which can endure sufficiently the strict conditions can be provided.

From the theoretical standpoint, the most desirable catalyst carrier is one which provides a maximum space for the flow of a source gas. Thus, if it were supposed that catalyst powders were fixed in the state of floating in space in a condition devoid of gravity and gas can freely flow through this space, the surface area of the catalyst would be the largest and the weight of the carrier would be at a minimum. This could lead to the minimization of the heat capacity of the catalyst carrier and its chemical and physical stability would become a maximum.

In this connection, because a catalyst carrier for a catalytic converter for treating exhaust gas, in accordance with the present invention, is woven from a glass fiber consisting predominantly of silica and which can be prepared in a very fine state, with this glass fiber being woven into a net-like sheet, a catalyst supported on a carrier embodying the invention offers a remarkably low resistance to the flow of exhaust gas, of the same order as if the catalyst were fixed in air.

With particular reference to the above-mentioned Hauel patent, in contrast to the Hauel disclosure, the catalyst carrier of the present invention is directly coated with the catalyst without using the Hauel ceramics and refractory as surface treating agents. For the purpose of providing a glass fiber which will have a high temperature resistance, in the present invention, a high purity silica fiber is used for forming the catalyst carrier, and whether or not an adherent ceramic coating is present is completely irrelevant to the present invention.

Furthermore, as the high temperature resistance glass fiber of the present invention is not coated with ceramics, the flexibility of the catalyst carrier is not lost and the woven fibers of the carrier are not broken by attrition due to pulsation or by mechanical shock. Consequently, a catalytic embodying the catalyst carrier of the present invention can continue stable operations for a long period of time.

DESCRIPTION OF THE PREFERRED EMBODIMENTS

By the synergistic effect of the various factors mentioned above, a catalyst, adhering to the surface of a catalyst carrier embodying the invention, is not stripped therefrom, so that it not only becomes possible to provide a catalytic converter, for treating a source gas, whose useful life is much longer than that of known catalytic converters, but also it becomes possible, for the first time, to provide such a catalytic converter, for treating a source gas, meeting not only the present strict standards but also anticipated higher standards while having a long life with maintenance of optimum performance.

In accordance with the present invention, a catalyst, for treating exhaust gases discharged from an internal combustion engine, having an extremely long life much greater than the expected life of known catalysts using a conventional carrier, and a long duration of performance up to standard, is provided. The synergistic effect producing this long life and long duration of performance meeting the required standards, is as follows:

As a catalyst according to the present invention, there is used glass fiber, consisting predominantly of silica, as a carrier, so that the catalyst has heat resistance (up to 1200° – 1300° C) and strength, and may be used in the state of a long, continuous fiber. Accordingly, even if the catalyst is used under strict conditions for treating exhaust gas of an internal combustion engine having a high temperature and pulsation, a phenomenon that the fiber is gradually scattered does not take place, and because this glass fiber, consisting predominantly of silica, is made into a net-like sheet, individual fibers reinforce each other against the mobile pressure and pulsation of the exhaust gas current to become tenacious. At the same time, the net-like sheet, consisting of mutually intertwined or interwoven fibers, is effective for decrement of vibration and, even when the amplitude (width) of pulsation due to the exhaust gas current is large, the catalyst does not vibrate violently. Because the fiber may be used after being made into a desired very fine state, the heat capacity is made small, stability is increased, and resistance to the exhaust gas current is little. Therefore, a catalyst having a very long life may be provided, according to the present invention.

Furthermore, and because, as mentioned above, the fiber is formed of glass consisting predominantly of silica, the fiber may be in the form of a very fine fiber. Consequently, there is produced the effect that the surface area of the catalyst is very large and the catalytic action is stabilized for a long period of time.

Results of a durability test by an actual vehicle (50,000 miles) using the catalytic composition according to the invention are shown below. This test was carried out in a known manner.

RESULTS OF DURABILITY TEST
VEHICLE (100 CID ENGINE)
TEST PROCESS CVS D/HL
G/mile (CONVERSION EFFICIENCY)

| MILEAGE | CO | HC |
|---|---|---|
| BASE LINE | 11.31 (%) | 1.18 (%) |
| 0 | 1.45 (87.3) | 0.23 (80.6) |
| 10,000 | 1.39 (87.0) | 0.30 (74.6) |
| 20,000 | 1.15 (84.6) | 0.18 (84.8) |
| 30,000 | 1.70 (85.0) | 0.30 (74.6) |
| 40,000 | 1.49 (86.8) | 0.26 (78.1) |
| 50,000 | 1.36 (88.0) | 0.25 (78.9) |

The invention will now be described and understood by the following illustrative examples:

EXAMPLE 1

A porous, net-like, sheet is produced by intertwining or interweaving fibers of a highly heat-resistant material consisting predominantly of silica with extremely low alkali content or of fibers of a chemically and thermally stable quartz or special glass. The sheet is impregnated with a solution of a catalyst, and then calcined to activate it. Thus, a catalyst sheet is obtained. The fibers used for producing the sheet may be twisted beforehand.

The net-like carrier is formed of a net-like sheet having a size of 3.5 – 60 mesh, preferably 3.5 – 32 mesh, on a Tyler's standard screen. Each yarn is composed of 2,000 – 10,000 micelle single fibers, each having a size of .3 to 40 $\mu$ (or micron). The solution of the catalyst is permeated and deposited on the surface of each individual micelle fiber and a catalyst film is produced by heat-treatment.

The size of the net-like sheet for use in small automobiles of the 1600 cc class is 20 cm in vertical length, 30 cm in width and 1 mm in thickness. The effective active surface area of the sheet of this size is calculated as 7.2 to 18.0 $m^2$-based on the micelle single fibers having a size of 5 to 20 $\mu$ (or micron). The sheet has an apparent volume of 0.06 liter and a weight of 0.06 kg. Even a carrier covered with a catalyst weighs less than 0.075kg. If one such catalyst sheet is not sufficiently effective with an engine in which the exhaust gas contains extremely large amounts of combustible components, an additional sheet of catalyst is used, and a stainless steel net is interposed between the two catalyst sheets so as to prevent a rise in the back pressure of exhaust gas from the engine. In this case, the catalyst sheet has an apparent volume of 0.25 liter, a weight of 0.25 kg, and an effective active surface area of 14.4 – 36.0 $m^2$.

As the conventional exhaust gas cleaning muffler, granular carriers with a diameter of 3 to 7 mm consisting of alumina, silica, magnesia or the like have been used, and 2.0 to 4.0 liters of the granular carrier are used with small size automobiles of this class.

In comparison with this, the catalyst carriers of the present invention, illustrated above, have an effective active surface 3 to 6 times as large as the conventional carriers in spite of the fact that their range of ratios of weight to volume are from 1/30 to 1/60 that of the conventional ones. This means that the heat capacity of the carrier has become extremely small, and that the time of start-up until the activating temperature of the catalyst is attained has been greatly shortened. Since the net-like carrier is constructed of flexible micelle fibers, it has good elasticity and there is no loss of catalyst due to friction or dropping of catalyst.

A mixed solution of two metals necessary for forming a co-crystallized oxide is impregnated into the net-like catalyst carrier of this Example 1. After drying, the carrier is calcined in a reducing atmosphere. One of the metals required to form the co-crystallized oxide is $M_1$, selected from transition metals, and the other metal is $M_2$, selected from metals which form acidic oxide. By combining these two kinds of metal, a chemically active and thermally stable co-crystallized oxide is formed in accordance with the following formula:

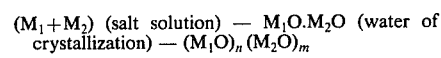
$(M_1+M_2)$ (salt solution) — $M_1O.M_2O$ (water of crystallization) — $(M_1O)_n (M_2O)_m$ A carbonate or water-soluble organic acid salt (for instance, acetate) of cobalt or nickel is used as $M_1$ and chromic acid or manganic acid, as $M_2$. The molar ratio of $M_1$ and $M_2$ is 1 – 25 : 100, and the concentration of the mixed aqueous solution is 15 – 40%. The net-like carrier is impregnated with the mixed solution, dried for 1 hour at 100° C, calcined for 3 hours at 500° – 800° C in a reducing atmosphere, e.g., containing hydrogen gas, to activate it, and further heated for 1 hour at 1000° C to complete the stabilization.

A gaseous mixture comprising 5.5% of carbon monoxide, 2000ppm of hydrocarbons, 6.0% of oxygen and other matter is passed through the catalyst carrier obtained in this Example 1 at a velocity of 10,000 gas volume per hour per catalyst carrier. The oxidation initiating temperature and the complete oxidation temperature at this time are shown in the following Table 1.

TABLE 1

| COMPOSITION OF GAS | CONTENT | OXIDATION INITIATING TEMP. (° C) | COMPLETE OXIDATION TEMP. (° V) |
|---|---|---|---|
| Carbon dioxide | 7.0 | — | — |
| Carbon dioxide | 5.5 | 40 | 120 |
| Oxygen | 6.0 | — | — |
| Hydrogen | 1.5 | 30 | 70 |
| Hydrocarbons | 2000 ppm | 120 | 310 |
| Methanol | 1500 ppm | 25 | 80 |
| Nitrogen | remainder | — | — |
| REMARKS | Space velocity $1 \times 10^4$ hour$^{-1}$ | | |

EXAMPLE 2

As the heat-resistant glass comprising silica with an extremely low alkali content as the main component, mentioned in Example 1, a chemically and thermally stable quartz glass or special glass may be used, but the quartz glass is poor in workability due to its high melting point, and is expensive.

In this Example 2, therefore, the woven fabric or net-like fabric mentioned in Example 1 is made using an inexpensive glass fiber having a low melting point and excellent workability, and then the fabric is treated with hydrochloric acid or sulfuric acid to remove the soluble components therefrom. The resultant highly heat-resistant silica glass of high silica content is subjected to a heat treatment and then submitted to the process described in Example 1, whereby, an inexpensive catalyst-containing carrier is obtained.

The mesh size of the carrier cloth, according to the invention, is determined from the conversion efficiency of a catalyst and the pressure drop of exhaust gas flowing through a catalyst bed.

Table 2 shows experimental date of the effect of carrier mesh size on CO conversion efficiency and pressure drop through the catalyst bed.

TABLE 2

| MESH SIZE (TYLER STANDARD SIEVE) | CO CONVERSION EFFICIENCY (%) | PRESSURE DROP (mm H$_2$O) |
|---|---|---|
| 2½ | 15 | — |
| 5 | 48 | 8 |
| 10 | 68 | 25 |
| 20 | 87 | 30 |
| 32 | 93 | 61 |
| 42 | 98 | 143 |
| 48 | 93 | 320 |

The above experimental data resulted from tests carried out using a tube furnace having an inner diameter of 35 mm and under the following conditions:

| Carrier | | |
|---|---|---|
| Diameter of silica glass filament | | 9 |
| Catalyst bed | | 35 mm diameter × 15 layers |
| Inlet gas | | |
| Temperature | | 300° C |
| Composition | CO$_2$ | 1.15% |
| | HC | — |
| | O$_2$ | 4.7% |
| | CO$_2$ | 11.3% |
| | H$_2$O | 10.0% |
| | N$_2$ | Remaining |

It is seen from Table 2 that the CO conversion efficiency of the catalyst is practically very low when the mesh size is under 3.5 Tyler standard sieve, and that the pressure drop of the catalyst bed goes up very steeply, exceeding the practical range, when the mesh size of the carrier is over 32 Tyler standard sieve.

From the above considerations, the optimum mesh size is determined between 3.5 and 32 Tyler standard sieve.

A durable continuous silica glass filament having a diameter of under 3 μ was not available practically. A silica glass filament having a diameter of about 40 μ did not have enough flexibility to be exposed in pulsating exhaust gas flow from an internal combustion engine. The defined range of the number of filaments per yarn was determined between 2,000 – 10,000 per yarn. It was found that a yarn with less than 2,000 filaments is too weak to weave into a cloth, and that a cloth woven from yearns each having more than 10,000 filaments is not suitable for practical use because of the lack of flexibility due to increased thickness of the cloth.

An example of leaching of glass fiber will now be described:

1. Mode of leaching

A commercially available glass cloth or net is impregnated with an aqueous solution of an inorganic acid such as HCl, and allowed to stand at 40° – 75° C for at least 2 hours to remove the alkaline contents contained in the glass cloth or net to obtain a sheet having silica purity of at least 95% and to provide sufficient heat resistance.

2. Example:

| | |
|---|---|
| Glass cloth: | electrical glass containing about 55% of silica |
| Acid: | 3 N HCl at a ratio of cloth 25 g/liter |
| Temperature: | 35° C |
| Time: | 20 hours |
| Purity: | silica 98% withstanding 1200° C was obtained. |

For use with the leached glass cloth or net, a catalyst was prepared as follows:

| | |
|---|---|
| 20 mol % of chromic acid | 500 wt parts |
| 10 mol % of cobalt acetate | 100 wt parts |
| propylene alcohol | 200 wt parts |

In the above ratio, these materials were blended, and stirred for 0.5 to 1.0 hour, to carry out an esterification reaction. The glass cloth was impregnated with the obtained reaction solution and thereafter dried at 200° – 250° C for 0.5 – 1.0 hour.

The obtained glass cloth was calcined at 700° – 850° C for 0.5 – 1.0 hour, and thereafter heat-treated at 800° C for 3 hours in a reducing atmosphere in hydrogen to activate it. The resulting catalyst had the anticipated catalytic conversion performance mentioned above.

It may be noted that, as a heat-resistant catalyst carrier, quartz glass, consisting predominantly of silica, is available, but it is too expensive to be used commercially. On the other hand, in accordance with the present invention, an inexpensive catalyst carrier is obtained by the simple operation of leaching (dealkalizing) commercially available glass cloth or net and, using such a glass cloth or net, a catalyst carrier, for a catalytic converter for use in cleaning exhaust gases of internal combustion engines and meeting not only the present standards but anticipated higher standards can be prepared.

In accordance with the present invention, the catalyst is applied directly to a highly heat-resistant catalyst carrier. Heretofore, it has been extremely difficult to provide a glass fiber catalyst support carrying a catalyst drug so that, in many cases, there has been used a method in which a powdered intermediate material is adhered to a glass fiber carrier after which the catalyst is applied to the intermediate material, such as disclosed in the above-mentioned Hauel U.S. Pat. No. 3,189,563. However, where a catalytic converter is prepared using a powdered intermediate material, the heat resistance of the intermediate material is low so that it has been impossible to provide the desired catalytic performance meeting the standards set forth above. On the other hand, with the present invention, the catalyst is excellent with respect to its heat resistance and its long durability with respect to operating at high efficiency.

While specific embodiments of the invention have been shown and described in detail to illustrate the application of the principles of the invention, it will be understood that the invention may be embodied otherwise without departing from such principles.

What is claimed is:

1. A catalyst, for treating the exhaust gas of an internal combustion engine, prepared by the process which comprises:
   a. preparing a carrier in the form of a flexible reticular fabric sheet consisting of spun yarn of 2000 – 10,000 glass filaments, of about 3 – 40 microns diameter, acid leached to remove solubles and to produce filaments of at least 95% purity silica, with the filaments having a heat resistance up to 1200° – 1300° C and the carrier sheet having a mesh in the range of 3.5 – 32 of the Tyler standard sieve;
   b. forming a reaction solution consisting of cobalt chromate, by mixing a water-soluble organic acid salt of cobalt with a material selected from the group consisting of chromium trioxide and chromic acid, and with propylene alcohol by blending and stirring for 0.5 – 1.0 hour, to carry out an esterification reaction;
   c. impregnating said carrier sheet with the obtained reaction solution and thereafter subjecting the impregnated carrier sheet to drying at 200° – 250° C for 0.5 – 1.0 hour;
   d. calcining the impregnated and dried carrier sheet at 700° – 850° C for 0.5 – 1.0 hour; and
   e. thereafter heat treating the catalyst at 800° C for substantially 3 hours in a reducing gas atmosphere containing hydrogen to activate the catalyst.

2. A catalyst, as claimed in claim 1, in which said water-soluble organic acid salt of cobalt is mixed with chromium trioxide.

3. A catalyst, as claimed in claim 1, in which said water-soluble organic acid salt of cobalt is mixed with chromic acid.

4. A catalyst, as claimed in claim 1, in which said water-soluble organic acid salt of cobalt and said material selected from the group consisting of chromium trioxide and chromic acid are reacted at a molar ratio of 1 – 25 : 100 to yield said cobalt chromate.

5. A catalyst, prepared by the process of claim 1, in which said catalyst is prepared from 500 parts by weight of 20 mol % of chromic acid, 100 parts by weight of 10 mol % of cobalt acetate, and 200 parts by weight of propylene alcohol.

* * * * *